United States Patent
De Boer et al.

(10) Patent No.: US 10,277,552 B2
(45) Date of Patent: Apr. 30, 2019

(54) RELATING TO MESSAGING GATEWAYS

(71) Applicant: MARKPORT LIMITED, Dublin (IE)

(72) Inventors: Doede De Boer, Huizen (NL); Marijn Kuijpers, Ijsselstein (NL)

(73) Assignee: Markport Limited, Dublin (IE)

(*) Notice: Subject to any disclaimer, the term of this patent is extended or adjusted under 35 U.S.C. 154(b) by 0 days.

(21) Appl. No.: 15/668,185

(22) Filed: Aug. 3, 2017

(65) Prior Publication Data
US 2017/0366499 A1  Dec. 21, 2017

Related U.S. Application Data

(63) Continuation of application No. PCT/US2016/016961, filed on Feb. 8, 2016.

(30) Foreign Application Priority Data

Feb. 9, 2015 (EP) .................................... 15154288
Feb. 9, 2015 (EP) .................................... 15154290

(51) Int. Cl.
  *H04L 12/58* (2006.01)
(52) U.S. Cl.
  CPC ............. *H04L 51/38* (2013.01); *H04L 51/06* (2013.01); *H04L 51/14* (2013.01)
(58) Field of Classification Search
  None
  See application file for complete search history.

(56) References Cited

U.S. PATENT DOCUMENTS

| | | |
|---|---|---|
| 7,502,339 B1 | 3/2009 | Pirkola et al. |
| 2007/0110076 A1 | 5/2007 | Brouwer et al. |
| 2007/0184860 A1 | 8/2007 | Jansson |
| 2009/0047967 A1 | 2/2009 | Zhu et al. |
| 2009/0129372 A1 | 5/2009 | Pandey et al. |
| 2009/0221310 A1 | 9/2009 | Chen et al. |
| 2010/0233992 A1 | 9/2010 | Nooren |

(Continued)

FOREIGN PATENT DOCUMENTS

| | | |
|---|---|---|
| EP | 1998526 A1 | 12/2008 |
| WO | 03103308 A1 | 12/2003 |
| WO | 2012164551 A2 | 12/2012 |

OTHER PUBLICATIONS

International Search Report dated Apr. 13, 2016 from corresponding PCT/US2016/016961, pp. 4.

(Continued)

*Primary Examiner* — Saumit Shah
(74) *Attorney, Agent, or Firm* — Ohlandt, Greeley, Ruggiero & Perle, L.L.P.

(57) ABSTRACT

The present disclosure provides a method of routing a short message to a user. According to the method, an SMSC sends a routing request to a HLR or HSS of the terminating user. The HLR or HSS has static provisioning settings for users and relays the request according to these settings. The HLR or HSS relays the request to the IP-SM-GW, which dynamically determines if the terminating user has attached to an IMS network and accordingly decides on onward routing of the message over circuit switched or IMS network elements. The present disclosure also provides a mobile network apparatus that is configured to perform the method.

32 Claims, 3 Drawing Sheets

(56) References Cited

U.S. PATENT DOCUMENTS

2012/0134351 A1    5/2012  Ewert et al.
2014/0128113 A1*  5/2014  Zisimopoulos ......... H04W 4/14
                                                                               455/466

OTHER PUBLICATIONS

International Written Opinion dated Apr. 13, 2016 from corresponding PCT/US2016/016961, pp. 6.
International Preliminary Report on Patentability (IPRP) dated Mar. 2, 2017 from corresponding PCT/US2016/016961, pp. 24.
Huawei et al. "Configuration of the IP-SM-GW in the HSS, Clarification for subscriber data in TS 23.204, Correction on SMS, MT delivery procedure, Successful MT Delivery Procedure in SMS-IP Architecture" No. S2-071066, Feb. 12, 2007, pp. 1-10, Retrieved from the Internet: http://www.3gpp.org/ftp/tsg_sa/WG2_Arch/TSGS2_56b-AH-St_Louis/Docs/S2-071066.zip [retrieved on Jan. 29, 2009].
"Universal Mobile Telecommunications System (UMTS): Support of Short Message Service (SMS) over generic 3GPP Internet Protocol (IP) access; Stage 2 (3GPP TS 23.204 version 7.1.0 Release 7)", Dec. 31, 2006, pp. 1-16, Retrieved from the Internet: http://www.3gpp.org/ftp/Specs/archive/23_series/23.204/23204-710.zip [retrieved on Feb. 2, 2009].
Extended European Search Report dated Oct. 2, 2018 for corresponding PCT/US2016/016961, 4 pages.

* cited by examiner

RELATING TO MESSAGING GATEWAYS

RELATED APPLICATION

The present application is a continuation of, and claims priority, to International application No. PCT/US2016/016961, filed Feb. 8, 2016 entitled "IMPROVEMENTS RELATING TO MESSAGING GATEWAYS", which in turn claims priority to European patent applications EP 15154290.9 entitled "IMPROVEMENTS RELATING TO MESSAGING GATEWAYS", and EP 15154288.3 entitled "IMPROVEMENTS RELATING TO MESSAGING GATEWAYS", both filed Feb. 9, 2015, each of which is incorporated herein by reference, and each of which is assigned to the assignee of the present application.

BACKGROUND OF THE DISCLOSURE

1. Field of the Disclosure

The present disclosure relates to messaging gateways, especially with the capability to handle voice over IP. An example of such a gateway according to the present disclosure is an IP Short-Message Gateway (IP-SM-GW) to provide interworking for SMS-over-IP in the IMS domain with the SMSC in the Circuit Switched (CS) domain according to the 3GPP standards.

2. Description of Related Art

At present, it is necessary for the gateway to process Third Party registration requests and propagate them to the HLRs and HSSs. This is an overhead that is required even if no actual messaging takes place. In more detail, according to 3GPP standards, the IP-SM-GW is an IMS Application Server (AS) that receives Third Party Registration (TPR) requests for IMS Users that register with the IMS network having the SMS-over-IP feature tag. When the IP-SM-GW AS receives the TPR, the IP-SM-GW subscribes (SIP SUBSCRIBE) to the registration event package in order to be notified (SIP NOTIFY) of all registration, re-registration and de-registration events from the S-CSCF for the IMS-User. It is the obligation of the IP-SM-GW to propagate the registration status of the IMS-User to the HLR/HSS via the MAP-ANY-TIME-MODIFICATION. This is required in order for the HLR to provide IMS location information back to SMSCs via a MAP-SEND-ROUTING-INFO-FOR-SM response when an SMS User is connected via the IMS network. Even when no messaging interworking has to be performed by the IP-SM-GW, the IP-SM-GW already has to process the TPR requests and notifications and propagate this information to the HLR/HSS.

SUMMARY OF THE DISCLOSURE

The present disclosure uses the following abbreviations for ease of understanding and to reduce unnecessary verbiage:
AS Application Server
CS Circuit Switched
CSCF Call Session Control Function
I-CSCF Interrogating CSCF
IMS IP Multimedia System
IP-SM-GW IP Short Message Gateway
LTE Long Term Evolution
MAP Mobile Application Part
S-CSCF Serving CSCF
SIP Session Initiation Protocol
SMS Short Message Service
SMSC Short Message Service Centre
TPR Third Party Registration
VoLTE Voice over LTE The present disclosure provides for messaging gateways capable to handle voice over IP.

The present disclosure also provides for a gateway that is an IP Short-Message Gateway (IP-SM-GW) that provides interworking for SMS-over-IP in the IMS domain with the SMSC in the Circuit Switched (CS) domain according to the 3GPP standards.

According to one embodiment of the present disclosure, there is provided a method of routing a short message to a user device, the method including the steps of:

sending a routing request to a HLR or HSS of the terminating user from an originating network element such as an SMSC, relaying the request to a gateway by the HLR or HSS, dynamically determining by the gateway if the terminating user has attached to an IMS network, and deciding accordingly on onward routing of the message over circuit switched or IMS network elements.

In one embodiment, the gateway is an IP-SM-GW.

In one embodiment, the delivery request is originated by an SMSC.

In one embodiment, the terminating user is a voice-over-Long-Term-Evolution (VoLTE) user.

In one embodiment, the request is a MAP-SRI-FOR SM request.

In one embodiment, the HLR or HSS has static provisioning settings for users and relays the request according to the settings.

In one embodiment, the step of dynamically determining by the gateway if the terminating user has attached to an IMS network that includes the gateway determining status and location of the terminating user in the circuit switched domain.

In one embodiment, the gateway sends the received routing query to the HLR or HSS for retrieving the status and location of the user in the circuit switched domain.

In one embodiment, the gateway performs the step of dynamically determining by the gateway if the terminating user has attached to an IMS network by subscribing to a registration event package in a control function, and receiving from the control function a notification with the terminating user status and contact addresses of the terminating user.

In one embodiment, the control function is a CSCF assigned to the user.

In one embodiment, the gateway sends a subscribe message to an I-CSCF in order to locate the S-CSCF to which the terminating user is assigned.

In one embodiment, the gateway receives in the notification a user status and S-CSCF URI and contact addresses of the terminating user.

In one embodiment, the gateway sets an expiry time of the subscription to the event package as being longer than an interval between individual delivery attempts.

In one embodiment, the method comprises the further steps of: receiving a notification by the originating network element if the terminating user is not present in either the IMS network or in a circuit switched network, and subsequently re-attempting sending of the message.

In one embodiment, the notification includes a delivery error-code.

In one embodiment, the originating network element is an SMSC.

In one embodiment, the originating network element adds itself to a message waiting list in the HLR or HSS for the terminating user's MSISDN, and when the terminating user registers again in the IMS network, an S-CSCF notifies the gateway which in turn notifies the HLR or HSS.

In one embodiment, the notification to the HLR or HSS includes a MAP-READY-FOR-SM to the HLR, and the HLR or HSS sends an alert to the originating network element, which then attempts a new delivery of the message.

In one embodiment, the gateway performs switching when a MAP-SEND-ROUTING-INFO-FOR-SM is received, or alternatively when a MAP-MT-FORWARD-SHORT-MESSAGE is received by the gateway.

In one embodiment, the disclosure provides a mobile network apparatus comprising:
an HLR or HSS, and
a gateway, wherein the HLR or HSS is configured to relay a routing request to the gateway, wherein the gateway is configured to dynamically determine if the terminating user of the routing request has attached to an IMS network, and wherein the gateway is configured to decide accordingly on onward routing of the message over circuit switched or IMS network elements.

In one embodiment, the gateway is an IP-SM-GW.

In one embodiment, the HLR or HSS has static provisioning settings for users and is configured to relay the request according to the settings.

In one embodiment, the gateway is configured to determine status and location of the terminating user in the circuit switched domain, and to send the received routing query to the HLR or HSS for retrieving the status and location of the user in the circuit switched domain.

In one embodiment, the gateway is configured to subscribe to a registration event package in a control function, and to receive from the control function a notification with the terminating user status and contact addresses of the terminating user.

In one embodiment, the gateway is configured to send a subscribe message to an I-CSCF in order to locate the S-CSCF to which the terminating user is assigned, and to receive in the notification a user status and S-CSCF URI and contact addresses of the terminating user.

In one embodiment, the gateway is configured to set an expiration time of the subscription to the event package as being longer than an interval between individual delivery attempts.

In one embodiment, the disclosure provides a non-transitory computer readable medium comprising software configured to cause a method as recited above in any embodiment to be implemented when executed by a digital processor.

BRIEF DESCRIPTION OF THE DRAWINGS

The present disclosure will be more clearly understood from the following description of some embodiments thereof, given by way of example only with reference to the accompanying drawings.

DETAILED DESCRIPTION OF THE DISCLOSURE

HLRs generally provide functionality to provision or configure a special Application Server Global Title in the MAP/SS7 network to which MAP-SEND-ROUTING-INFO-FOR-SM messages can be forwarded and where Mobile Terminated SMS traffic (MAP-MT-FORWARD-SHORT-MESSAGE) can be intercepted and processed before final delivery to the terminating user. This feature can be used for the IP-SM-GW function as well.

Instead of using the HLR or HSS as a switching point for making the choice whether delivery of a Mobile Terminated SMS should be done via the IMS or Circuit Switched network, the IP-SM-GW can do this function in a more efficient way.

When an SMSC wants to deliver a Mobile Terminated SMS to a VoLTE User, the SMSC sends a MAP-SEND-ROUTING-INFO-FOR-SM to the HLR/HSS of the terminating User. The HLR/HSS has a static provisioning of VoLTE Users and will relay the MAP-SEND-ROUTING-INFO-FOR-SM to the IP-SM-GW. The IP-SM-GW will send the MAP-SEND-ROUTING-INFO-FOR-SM to the HLR for retrieving the status and location of the user in the Circuit Switched network. In order to discover whether the VoLTE User is attached to the IMS-network, the IP-SM-GW will subscribe (SIP SUBSCRIBE) to the registration event package (event reg:) in the S-CSCF. The SIP SUBSCRIBE should be sent via the I-CSCF in order to find the S-CSCF to which the terminating user is assigned. The IP-SM-GW will receive a notification (NOTIFY) with the IMS user status, S-CSCF URI and contact addresses of the devices of the terminating user. This information can be used by the IP-SM-GW to deliver the Mobile Terminated SMS over SIP to the terminating user. The expiry-time of the subscription to the registration event package should be longer than the interval between individual delivery attempts of the sending SMSC in order to use the SMSC delivery attempt to have the IP-SM-GW initiating a new subscribe to the registration event package (event reg:) in the S-CSCF. This will prevent the IP-SM-GW to keep state about when a new subscriber needs to be initiated.

Figure 1:
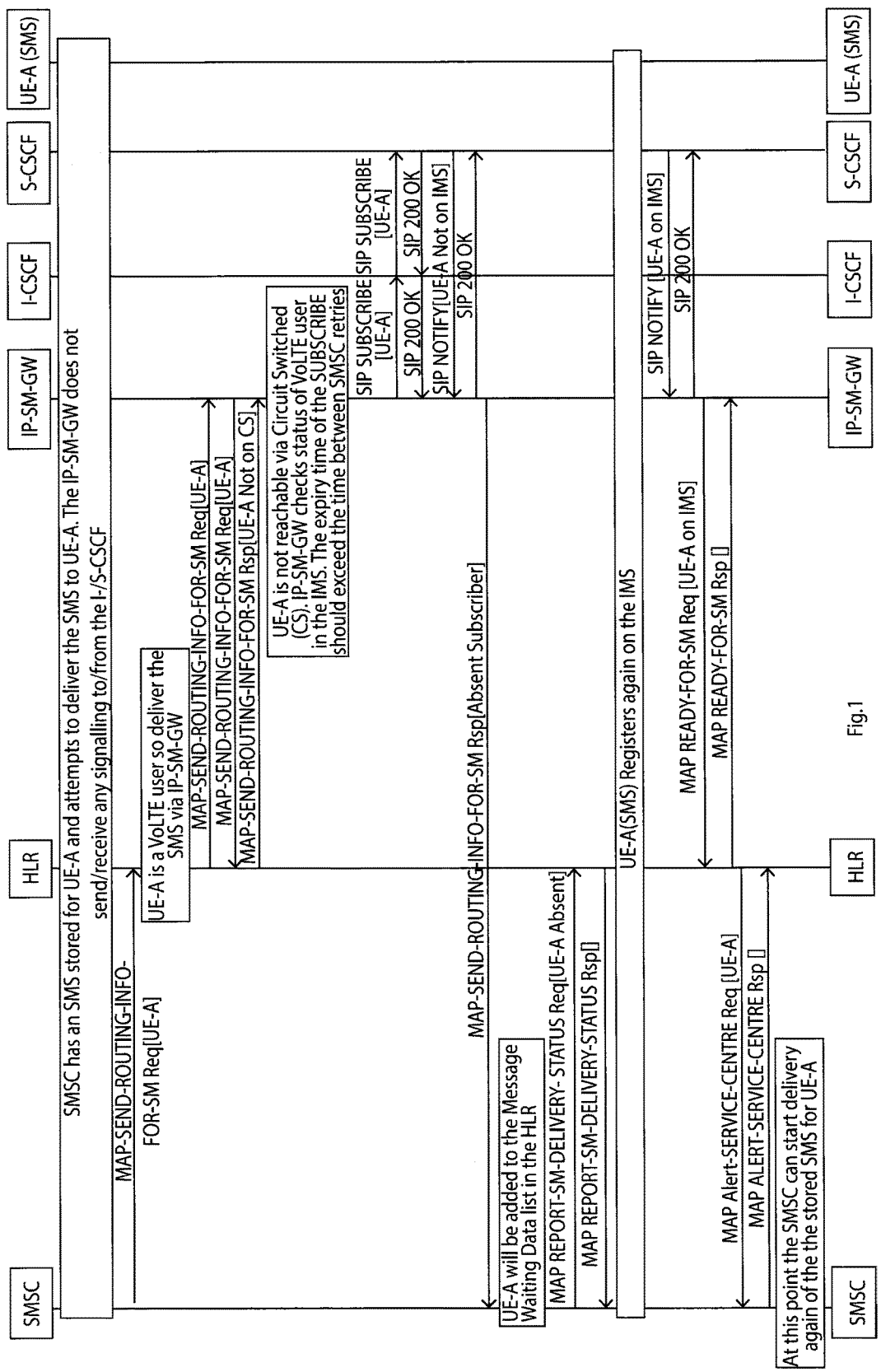
FIG. 1 shows a message sequence diagram illustrating an embodiment in which the terminating user is not present in the IMS domain.

If delivery of the Mobile Terminated SMS fails due to the fact that the VoLTE user was not registered in the IMS and also not in the Circuit Switched network, the delivery error-code will be returned in the negative response to the SMSC and the SMS will be re-scheduled for a new delivery attempt. The message flows are illustrated in FIG. 1. The SMSC will also add itself to the Message Waiting Data (MWD) list in the HLR for the VoLTE user's MSISDN using the MAP-REPORT-SM-DELIVERY-STATUS. When the VoLTE user registers again in the IMS, the S-CSCF will notify the IP-SM-GW, which in turn will send a MAP-READY-FOR-SM to the HLR. Since the VoLTE user's MSISDN and SMSC are in the HLR MWD list, the HLR will send a MAP-ALERT-SERVICE-CENTRE to the SMSC. When receiving the MAP-ALERT-SERVICE-CENTRE for the VoLTE user, the SMSC will do a new delivery attempt of the Mobile Terminated SMS to the VoLTE User.

It will be appreciated by those of skill in the art that the disclosure uses existing HLR features to relay MAP-SEND-ROUTING-INFO-FOR-SM to an IP-SM-GW for delivery of Mobile Terminated SMS to IMS Users. There is no additional signaling introduced on the MAP/SS7-network due to the present disclosure. Also, no signaling will be required on the IMS-network when no Mobile Terminated SMS is due to be delivered by the SMSCs.

Figure 2A:
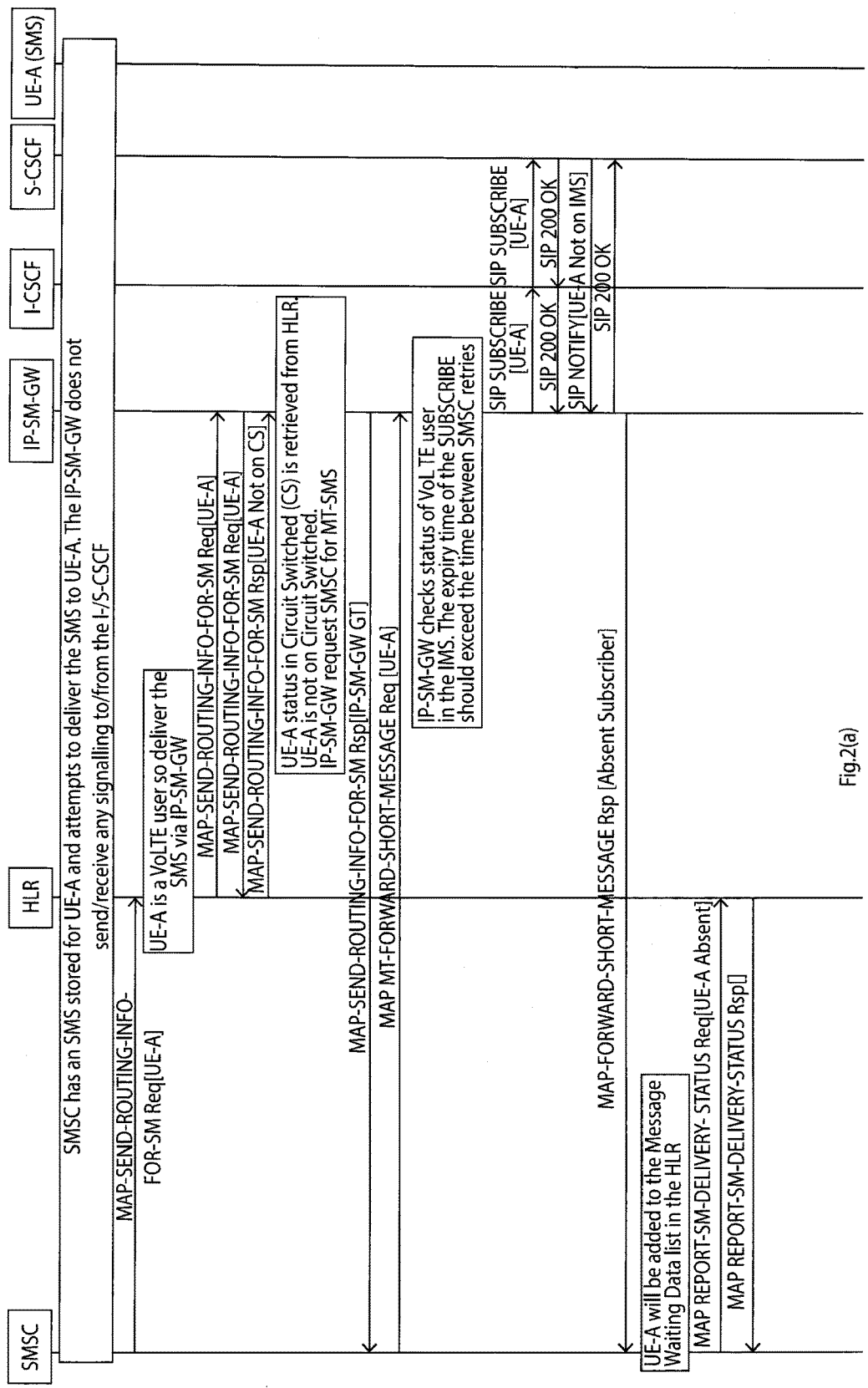
FIGS. 2(a) and 2(b) together show a message sequence diagram in which a MT-FORWARD SM response is sent by the IP-SM-GW to the originating SMSC.
Figure 2B:
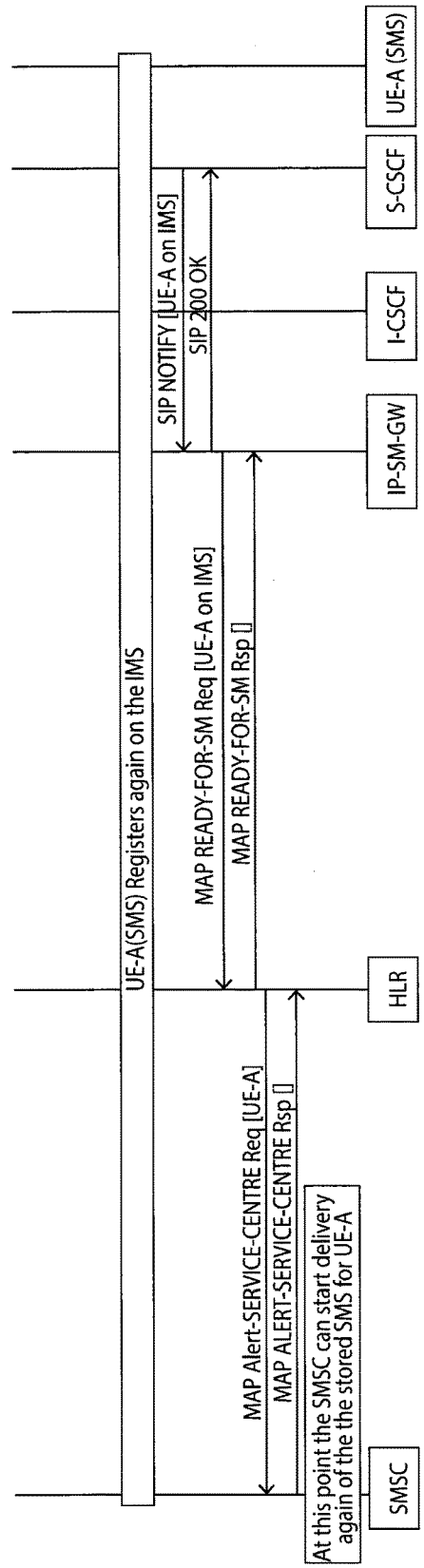

The present disclosure is not limited to the embodiments described but can be varied in construction and detail. For example, in another embodiment illustrated in FIGS. 2(a) and (b), the moment of switching is not done at the moment that the MAP-SEND-ROUTING-INFO-FOR-SM is received, but at the moment that the MAP-MT-FORWARD-SHORT-MESSAGE is received by the IP-SM-GW. In FIGS. 2(a) and 2(b), the message sequence shown is a MT-FORWARD SM response that is sent by the IP-SM-GW to the originating SMSC.

While the present disclosure has been described with reference to one or more exemplary embodiments, it will be understood by those skilled in the art that various changes can be made and equivalents can be substituted for elements thereof without departing from the scope of the present disclosure. In addition, many modifications can be made to adapt a particular situation or material to the teachings of the disclosure without departing from the scope thereof. Therefore, it is intended that the present disclosure is not limited to the particular embodiment(s) disclosed as the best mode contemplated, but that the present disclosure will include all embodiments falling within the scope of the appended claims.

What is claimed is:

1. A method of routing a short message to a user device, the method including the steps of:
   sending a short message routing request from an originating network element directly to an HLR or HSS of a terminating user;
   relaying the short message routing request by the HLR or HSS to a gateway;
   determining dynamically by the gateway if the terminating user is attached to an IMS network, wherein the determining is performed by:
   subscribing to a registration event package in a control function, and
   receiving from the control function a notification with a user status and S-CSCF URI and contact addresses of the terminating user; and
   deciding, by the gateway, whether to perform onward routing of the short message over circuit switched domain or IMS network elements.

2. A method as claimed in claim 1, wherein the gateway is an IP-SM-GW.

3. A method as claimed in claim 1, wherein the short message routing request is originated by an SMSC.

4. A method as claimed in claim 1, wherein the terminating user is a voice-over-Long-Term-Evolution (VoLTE) user.

5. A method as claimed in claim 1, wherein the short message routing request is a MAP-SRI-FOR-SM request.

6. A method as claimed in claim 1, wherein the HLR or HSS has static provisioning settings for users and relays the short message routing request according to the settings.

7. A method as claimed in claim 1, further comprising sending the short message routing request to the HLR or HSS for retrieving the status and location of the user in the circuit switched domain.

8. A method as claimed in claim 1, further comprising setting, by the gateway network entity, an expiration time of the subscription to the event package as longer than an interval between individual delivery attempts.

9. A method as claimed in claim 1, further comprising, if the originating network element receives a notification that the terminating user is not present in either the IMS network or in a circuit switched domain, re-attempting sending the message at a subsequent time.

10. A method as claimed in claim 9, wherein the notification includes a delivery error-code.

11. A method as claimed in claim 9, wherein the originating network element is an SMSC.

12. A method as claimed in claim 11, further comprising the steps of:
    adding, by the originating network element, itself to a message waiting list in the HLR or HSS for the terminating user's MSISDN;
    notifying, by an S-CSCF, the gateway when the terminating user registers again in the IMS network; and
    notifying, by the gateway, the HLR or HSS.

13. A method as claimed in claim 12, wherein the notification to the HLR or HSS includes a MAP-READY-FOR-SM to the HLR, and further comprises the steps of:
    sending, by the HLR or HSS, an alert to the originating network element; and
    attempting, by the originating network after receiving the alert, a new delivery of the message.

14. A method as claimed in claim 12, further comprising switching, by the gateway, when the gateway receives a MAP-SEND-ROUTING-INFO-FOR-SM or a MAP-MT-FORWARD-SHORT-MESSAGE.

15. A mobile network apparatus comprising:
    an HLR or HSS; and
    a gateway, wherein the HLR or HSS is configured to perform the step of:
    relaying the short message routing request by the HLR or HSS to a gateway, and wherein the gateway is configured to perform the steps of:
    determining dynamically if the terminating user is attached to an IMS network, wherein the determining is performed by:
    subscribing to a registration event package in a control function, and
    receiving from the control function a notification with a user status and S-CSCF URI and contact addresses of the terminating user; and
    deciding whether to perform onward routing of the short message over circuit switched domain or IMS network elements.

16. An apparatus as claimed in claim 15, wherein the gateway is an IP-SM-GW.

17. An apparatus as claimed in claim 16, wherein the HLR or HSS has static provisioning settings for users and is configured to relay the request according to the settings.

18. An apparatus as claimed in claim 15, wherein the gateway is further configured to set an expiry time of the subscription to the event package as longer than an interval between individual delivery attempts.

19. A non-transitory computer readable storage medium, the storage medium comprising instructions that are readable by a processor and cause the processor to perform the steps of:
    sending a short message routing request from an originating network element directly to an HLR or HSS of a terminating user;
    relaying the short message routing request by the HLR or HSS to a gateway;
    determining dynamically by the gateway if the terminating user is attached to an IMS network, wherein the determining is performed by:
    subscribing to a registration event package in a control function, and
    receiving from the control function a notification with a user status and S-CSCF URI and contact addresses of the terminating user; and deciding, by the gateway, whether to perform onward routing of the short message over circuit switched domain or IMS network elements.

20. A storage medium as claimed in claim 19, wherein the gateway is an IP-SM-GW.

21. A storage medium as claimed in claim 19, wherein the short message routing request is originated by an SMSC.

22. A storage medium as claimed in claim 19, wherein the terminating user is a voice-over-Long-Term-Evolution (VoLTE) user.

23. A storage medium as claimed in claim 19, wherein the short message routing request is a MAP-SRI-FOR-SM request.

24. A storage medium as claimed in claim 19, wherein the HLR or HSS has static provisioning settings for users and relays the short message routing request according to the settings.

25. A storage medium as claimed in claim 19, further comprising sending the short message routing request to the HLR or HSS for retrieving the status and location of the user in the circuit switched domain.

26. A storage medium as claimed in claim 19, further comprising setting, by the gateway, an expiration time of the subscription to the event package as longer than an interval between individual delivery attempts.

27. A storage medium as claimed in claim 19, further comprising, if the originating network element receives a notification that the terminating user is not present in either the IMS network or in a circuit switched domain, re-attempting sending the message at a subsequent time.

28. A storage medium as claimed in claim 27, wherein the notification includes a delivery error-code.

29. A storage medium as claimed in claim 27, wherein the originating network element is an SMSC.

30. A storage medium as claimed in claim 29, further comprising the steps of:
    adding, by the originating network element, itself to a message waiting list in the HLR or HSS for the terminating user's MSISDN;
    notifying, by an S-CSCF, the gateway when the terminating user registers again in the IMS network; and
    notifying, by the gateway, the HLR or HSS.

31. A method as claimed in claim 30, wherein the notification to the HLR or HSS includes a MAP-READY-FOR-SM to the HLR, and further comprises the steps of: sending, by the HLR or HSS, an alert to the originating network element; and
    attempting, by the originating network after receiving the alert, a new delivery of the message.

32. A method as claimed in claim 30, further comprising switching, by the gateway, when the gateway receives a MAP-SEND-ROUTING-INFO-FOR-SM or a MAP-MT-FORWARD-SHORT-MESSAGE.

\* \* \* \* \*